United States Patent

Nakabayashi et al.

[11] 4,027,075
[45] May 31, 1977

[54] SODIUM SULFUR STORAGE BATTERY

[75] Inventors: Takashi Nakabayashi; Hiroshi Kagawa, both of Takatsuki, Japan

[73] Assignee: Agency of Industrial Science & Technology, Tokyo, Japan

[22] Filed: Jan. 29, 1975

[21] Appl. No.: 545,310

[30] Foreign Application Priority Data

May 31, 1974 Japan .............................. 49-60933

[52] U.S. Cl. .............................................. 429/104
[51] Int. Cl.² ..................................... H01M 10/34
[58] Field of Search .................... 136/6 FS; 429/104

[56] References Cited

UNITED STATES PATENTS

| | | | |
|---|---|---|---|
| 3,413,150 | 11/1968 | Kummer et al. | 136/6 FS |
| 3,514,332 | 5/1970 | Minck | 136/6 FS |
| 3,758,337 | 9/1973 | Fally et al. | 136/6 FS |
| 3,811,943 | 5/1974 | Minck | 136/6 FS |
| 3,915,741 | 10/1975 | Kogiso et al. | 136/6 FS |

*Primary Examiner*—Anthony Skapars
*Assistant Examiner*—H. A. Feeley
*Attorney, Agent, or Firm*—Pierce, Scheffler & Parker

[57] ABSTRACT

This invention relates to a sodium sulfur storage battery including sulfur as a cathodic reactant, sodium as an anodic reactant and a non-porous solid electrolyte, the storage battery having a partition means in a chamber of sodium. According to this invention, even if a part of the solid electrolyte is broken, direct reaction between the both reactants is controlled in a smaller scale thus preventing the spread of electrolyte deterioration.

4 Claims, 13 Drawing Figures

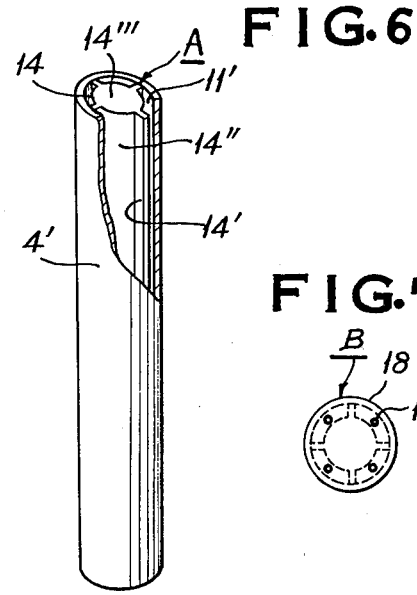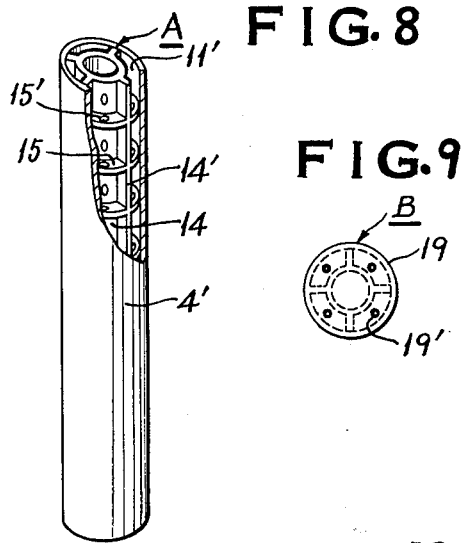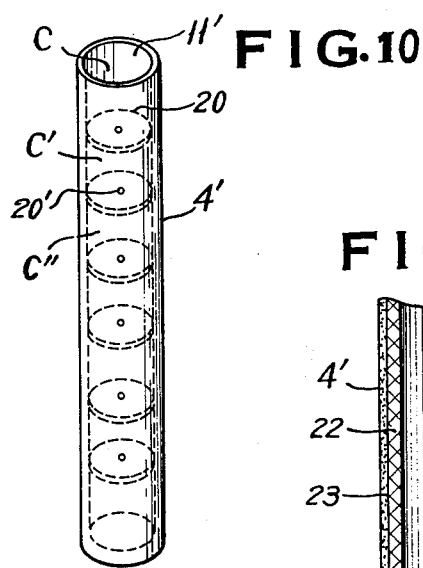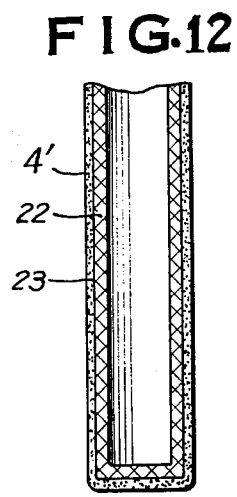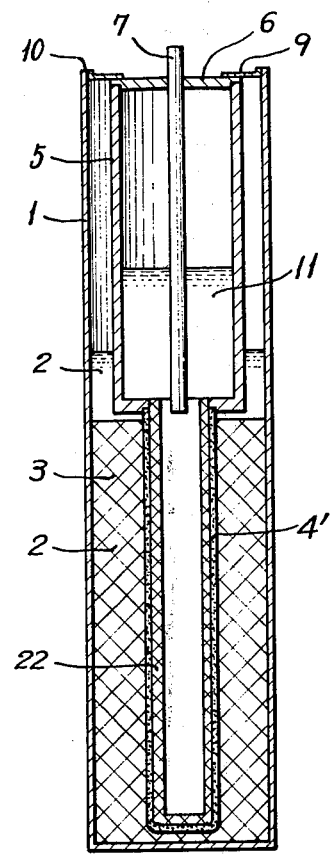

SODIUM SULFUR STORAGE BATTERY

This invention relates to a sodium sulfur storage battery.

A conventional sodium sulfur storage battery generally comprises a vessel housing sulfur or sodium polysulfide as a cathodic reactant, sodium as an anodic reactant and a non-porous solid electrolyte which permits only sodium ions to pass. The cathodic and anodic reactants are kept in the molten state at high temperature — about 300° C. — so as to activate the battery rechargeably according to the following electromotive reaction:

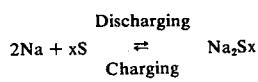

$$2Na + xS \underset{\text{Charging}}{\overset{\text{Discharging}}{\rightleftarrows}} Na_2Sx$$

Because the solid electrolyte is in the form of a body of ceramic material with fine-grained sintered powder, it is comparatively difficult completely to avoid the occurrence of any fine or invisible cracks, pinholes and so on in the body. Therefore, in many of the conventional batteries the solid electrolyte is usually found broken even after some cycles of the thermal cycling test is completed, in which test each battery is heated from the normal room temperature up to an operative high temperature of, for example, 300° C., and then is cooled down to the original room temperature at a predetermined temperature-time rate. According to a thorough check-up, this unfavorable phenomenon is caused by the fact that inherently inevitable cracks distributed in the body of ceramic solid electrolyte gradually enlarge due mainly to the high temperature, to the extent sufficient to flow the molten sodium and molten sulfur freely. Thus, the sodium and sulfur both in the molten state react explosively with each other in and around the cracks, to emit a large amount of heat and pressure which energize the growth of cracks until the solid electrolyte is broken. As a result, whole molten sodium in an upper reservoir, as well as the sodium in the solid electrolyte tube, flows out of the broken part and is used up for the unexpected direct reaction to fatally increase the explosive power.

It is a principal object of this invention to provide a sodium sulfur storage battery with a partition means in a chamber of the anodic reactant (sodium), so as to prevent any large scale direct reaction between both reactants even if a part of the solid electrolyte is broken. The separating means also functions to prevent the spread of electrolyte deterioration.

A second object of the invention is to provide a sodium sulfur storage battery which is mechanically, strong in structure.

These and other objects and advantages will be apparent from the following detailed description when read in conjunction with the accompanying drawings, wherein:

FIGS. 2, 4, 6, 8 and 10 are perspective views of modified tubes made of solid electrolyte applicable in place of a tube shown in FIG. 1;

FIGS. 3, 5, 7, 9 and 11 are plan views of upper partition means each of which is attached to the corresponding tube as shown in FIGS. 2, 4, 6, 8 and 10;

FIG. 12 is a sectional and elevational view of another tube made of solid electrolyte; and FIG. 13 is a sectional and elevational view of a sodium sulfur storage battery with the tube shown in FIG. 12 therein.

Similar characters of reference indicate similar parts in the several figures of the drawings.

Figure 1:
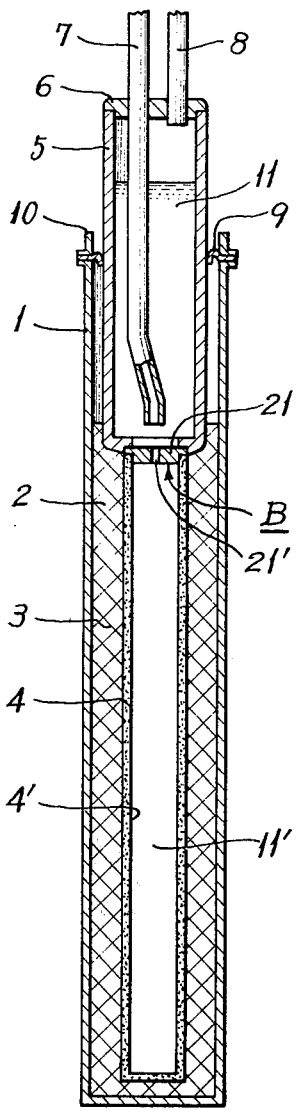
FIG. 1 is a central sectional and elevational view of an elementary sodium sulfur storage battery embodying this invention.

Referring now to FIG. 1, a sodium sulfur storage battery, according to this invention, is composed of various elements, i.e., a tubular cell vessel 1 which is made of stainless steel containing molten sulfur as cathodic reactant 2; a graphite electron conductor 3 with an annular cross-section; a solid electrolyte 4 made of $\beta$-aluminum oxide ($\beta$-$Al_2O_3$) in the shape of a tube 4' which is provided with an upper partition means B, e.g., a stainless steel cover 21 with a small hole 21' in it the diameter of which hole being 20 - 200 $\mu$; a sodium reservoir 5 of $\alpha$-aluminum oxide ($\alpha$-$Al_2O_3$); a cover 6 ($\alpha$-$Al_2O_3$); a sodium injecting pipe 7 (of stainless steel) which also functions as a negative teminal post; an exhaust pipe 8; an anti-corrosive metal cover 9 which is affixed outside the reservoir 5; a stainless steel positive terminal post 10; and sodium as an anodic reactant 11 contained in a chamber 11'.

The electrolyte tube 4' is closely surrounded by the graphite conductor 3 which contains sulfur as cathodic reactant therein, and is affixed to the reservoir 5 at its upper end, in liquid-tight relationship, by glass solder or the like together with partition 21 in which latter a hole 21' is provided to connect chamber 11' with the interior of reservoir 5. Tube 4' thus assembled with partition 21 and reservoir 5 is positioned in cell vessel 1, and after additional molten sulfur has been poured in the cavity formed between tube 4' and cell vessel 1, said cover 9 and positive terminal post 10 are welded to the cell vessel 1 in the same liquid-tight relationship, and then glass solder is applied at an annular junction between cover 9 and reservoir 5. Other junctions formed between reservoir 5, cover 6, sodium injecting pipe 7 and exhaust pipe 8 are also sealed with glass solder or the like. The pipe 7 is closed after a predetermined amount of sodium is injected in the chamber 11' and reservoir 5 so as to function only as a negative terminal post. The lower end of the pipe 7 is always dipped in the reactant 11. The exhaust pipe 8 which opens inside upper space of the reservoir 5 is closed after the assembling process has been completed.

Partition 21, an example of the upper separating means B, divides molten sodium 11 into two parts, i.e., a lower part contained in the tube 4' and an upper part in the reservoir 5, both parts commumicating by means of small hole 21' which prevents rapid fall of sodium during operation. Therefore, the hole 21' is adapted to pass molten sodium under the influence of a slight pressure, and to prevent leak or infiltration if the pressure is eliminated.

During discharging process of the battery, sodium 11 in the chamber 11' infiltrates and passes through electrolyte tube 4', and decreases in the amount as the reaction between both reactants proceeds thus forming a cavity in the upper part of tube 4'. On account of a vacuum developed in the upper cavity, a corresponding amount of sodium in the reservoir 5 is supplied to the cavity through the hole 21' to fill the chamber 11' with sodium. On the other hand, during charging process, sodium in charge of the preceding reaction returns to the chamber 11' and raises the inside pressure to send the excessive amount of sodium back to the reservoir 5.

During continued operation, when electrolyte tube 4' has become partially broken down due mainly to the aforementioned fine cracks or pinholes, anodic reactant 11 and cathodic reactant 2 react directly at the broken part developing a large amount of heat and pressure until anodic reactant 11 (sodium) is used up for the explosive reaction. The great amounts of heat and pressure thus developed fatally damage not only the battery in question but nearby normal batteries.

According to the present invention, anodic reactant 11 (sodium) contained in the reservoir 5 never joins or participates in the accidental reaction because of the partition 21 as an upper partition means which prevents upper sodium from pouring in the chamber 11' on account of high positive pressure in the latter developed by the direct reaction. Therefore, the amount of sodium which attends to the direct reaction is limited to that contained in the chamber 11' thus restricting the accident to a smaller scale.

Figure 2:
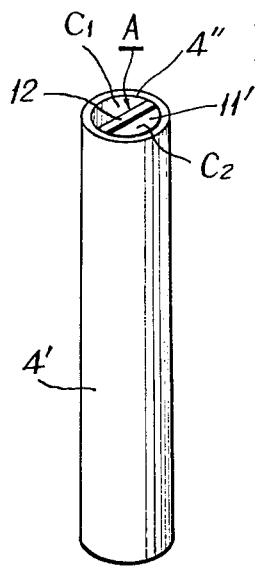

Electrolyte tube 4' illustrated in FIG. 1 may be replaced with the counterpart shown in FIG. 2. The tube 4' (FIG. 2) is provided with a longitudinal partition 12 as one example of inner partition means A which snugly fits on the inner surface of the tube 4' and is sealed by glass solder to completely divide the chamber 11' into two chambers $C_1$ and $C_2$. Affixed on upper openings 4'' of the chambers is a partition 16 (FIG. 3) as another example of upper partition means B which is provided with two small holes 16' providing communication between chambers $C_1$ and $C_2$ and reservoir 5 (FIG. 1), in the same manner as explained in connection with hole 21', FIG. 1.

Figure 3:
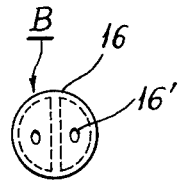

The partition 16 is also provided with annular and lateral grooves on the lower surface as shown in dotted line on FIG. 3, in which the upper end portions of corresponding tube 4' and partition 12 (FIG. 2) are received with glass solder therebetween.

In an experiment, an electrolyte tube in the shape shown in FIG. 2, which was confirmed by an optical microscope to carry a fine crack on its side wall, was used together with the partitions 12, 16 to build up a sample battery. The battery operated in the normal manner during the first test cycle consisting of a charging and a discharging process. But in the second cycle of the test including an additional thermal cycle, fatal short circuiting occurred when the temperature around the battery reached about 290° C. After the damaged battery was cooled, it was overhauled for a thorough check-up. As a result, it was found that the electrolyte tube 4' was broken, at the upper part where the original crack was located, and direct reaction between cathodic reactant 2 and anodic reactant 11 was detected due to the fact that nothing was found in the sodium chamber $C_1$ facing the crack except for a small amount of black reaction products remaining therein. Besides, a hollow part was formed on the vertical surface of the partition 12 opposing the crack, and the vertical surface was burnt and scorched.

On the contrary, sodium in the adjacent longitudinal chamber $C_2$ and upper reservoir 5 did not participate in the direct reaction, thus remaining as it was.

Thirty batteries with electrolyte tubes as shown in FIG. 2 were put to the test which includes repeated charging-discharging cycles and additional cycles of heating up to about 350° C. then cooling down to normal (room) temperature at the predetermined rate of 100° C. per hour. The result is shown in Table I.

TABLE I

| Batch | Numbers | Broken part on electrolyte | on tube | Partition's condition | Sodium in broken chamber |
|---|---|---|---|---|---|
| Broken in | | upper | 9 | normal | a little remained in two tubes |
| 0 – 5 | 14 | middle | 4 | partially abnormal | nothing remained |
| cycles | | lower | 1 | partially abnormal | nothing remained |
| Broken in | | upper | 4 | normal | nothing remained |
| 6 – 15 | 6 | middle | 1 | normal | nothing remained |
| cycles | | lower | 1 | partially abnormal | nothing remained |
| Normal after 16 cycles | 10 | | | | |

As will be clearly understood from Table I, only a divided portion of sodium participated in direct reaction with the cathodic reactant even if a part of the electrolyte tube breaks under thermal stresses, in that internal partition means A, such as longitudinal partition 12 (FIG. 2) and/or upper partition means B such as partition 16 (FIG. 3) are employed. Therefore, accidental damages are confined to a local limited scale and its spreading is effectively prevented.

The invention will be more fully understood from the following examples.

EXAMPLE 1

Figure 4:
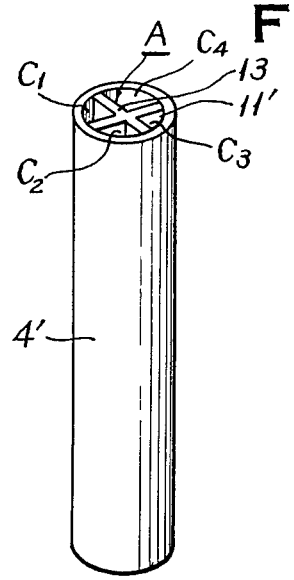
Figure 5:
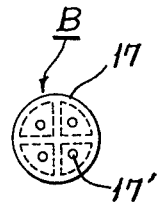

Referring to FIG. 4 of the drawing, there is shown a longitudinal partition 13 with a cross section as another example of internal partition means A, said partition 13 being adapted to divide the electrolyte tube 4' into four laterally adjacent chambers $C_1$, $C_2$, $C_3$ and $C_4$. These chambers are closed by a partition 17 (FIG. 5) provided with four holes 17' each communicating with the corresponding chamber. According to this construction, since each chamber has one half volume compared with the counterpart shown in FIG. 2, the direct reaction decreases about one half in scale. A test revealed that there was only a slight change in color on the inner surface of the broken chamber.

EXAMPLE 2

In FIG. 6, electrolyte tube 4' is divided into four longitudinal chambers by an internal partition means A such as a tubular partition 14 made of stainless steel and comprising a hollow tubular body 14'', four longitudinal flanges 14' on the outer surface of the body 14'' and two end plates 14''' all in one body. The partition 14 is affixed to the inside surface of tube 4 by means of glass solder or the like. A stainless steel partition 18 (FIG. 7) with four small holes 18' for sodium to pass is affixed and soldered at the upper end of tube 4' together with the partition 14. Thus the sodium content in each chamber decreases in volume because sodium is maintained in the shallow longitudinal space with an arcuate cross-section.

A battery comprising the tube 4' (FIG. 6) was overhauled after the same battery test. It was found that the surface of partition 14 had kept almost normal even at the part which opposed a broken part of electrolyte tube 4', and no damage was detected in the adjacent chambers where sodium was left in the normal condition.

Many small holes may be provided on the tubular body 14' to keep supplementary sodium in it. In that case, end plates 14''' are not necessary.

EXAMPLE 3

Referring now to FIG. 8, many annular integral flanges 15 are formed on the outer surface of tubular partition 14. Each flange is provided with four small holes each of which is located between two longitudinal flanges 14' and has a diameter of approximately 200 $\mu$ for sodium to pass under pressure in the same manner as mentioned hereinbefore. Therefore, sodium in contact with the inner surface of electrolyte tube 4' is further divided into smaller fractions.

After the battery test, the overhauled battery showed that a few chambers surrounding a chamber with broken electrolyte portion were found to be a little damaged. The amount of sodium in charge of the accidental reaction decreased considerably and tubular partition 14 and flanges 14', 15 were kept normal. In other chambers, no damage at all was found.

EXAMPLE 4

In the example shown in FIG. 10, electrolyte tube 4' is divide into seven chambers C, C', C'' — with internal partition means which is composed of six round lateral partition 20 made of stainless steel each carrying a sodium passageway 20' with a diameter ranging from 20 $\mu$ to 200 $\mu$. Each partition 20 is glass soldered to the internal surface of tube 4'. A stainless steel partition 20'' (FIG. 11) is also affixed at the upper open of chamber C to divide the latter from the reservoir communicating only through a hole 20'.

A sample battery including an electrolyte tube as shown in FIG. 10 was made and put to the test until short circuiting occurred. Internal inspection showed that electrolyte tube 4' facing the second chamber C' was broken and upper and lower partition 20 were burnt leaving black surfaces inside the chamber C'. A recess was also found on each of the burnt surfaces. Sodium remained in the other chambers without any change.

In the above examples, the diameter of holes 21', 16', 17', 18', 15', 19', 20' should be limited within the scope of 20 $\mu$ to 200 $\mu$ because when the diameter is less than 20 $\mu$ sodium is difficult to pass, and when it is more than 200 $\mu$, sodium passes too freely so that its separating effect may not be expected. Each partition means A, B should not only be of anit-corrosive material against attach caused by molten sodium but also be strong enough to resist the heat and pressure developed in the accidental reaction between cathodic and anodic reactants. Although the partition presented in the above examples are made of stainless steel, it may be replaced with some ceramic material such as alumina.

In modifying the present invention, any container, made of solid electrolyte, which does not have a circular cross-section may be used in place of electrolyte tube 4' shown in FIGS. 1 through 10. In that case, the shape of partition means changes according to the configuration of the electrolyte container.

EXAMPLE 5

Referring to FIGS. 12, 13, numeral 22 designates a porous tube composed of sintered stainless steel with many fine cavities each of which is connected to adjacent cavities to form many sodium passages extending from inside to outside of the tube 22. Each passage has a small diameter in the range of 20 $\mu$ to 200 $\mu$. The tube 22 closely fits the inner surface 23 of electrolyte tube 4'. Therefore, molten sodium touches on the surface 23 independently divided by the fine passages.

A battery with a tube 4' of same construction as shown in FIG. 13 was put to the thermal cycle test in which the battery was heated up to 300° C. and cooled down to room temperature at a controlled rate of 100° C. per hour. Although the electrolyte tube 4' originally carried many cracks, no fatal damage was found after the thermal test. This proves that, according to the present invention, a sudden explosive phenomenon is avoided effectively even if a defective electrolyte tube which might formerly cause an explosive damage in the battery.

Since the porous tube 22 is provided with many passages of 20 $\mu$ to 200 $\mu$ in diameter, sodium transfer is allowed during charging and discharging processes. Besides, even when a part of electrolyte tube is broken, only a small amount of sodium contained in the near-by passages participates in the direct reaction thus preventing further pouring of sodium to the cite of reaction and further spread of deterioration in the solid electrolyte. As is to be clearly understood, the porous tube 22 functions as one of the internal partition means so that at least the sodium in the vicinity of electrolyte surface 23 is finely divided into many independent portions. This is effective for the purpose of this invention.

In modifying the invention, porous tube 22 may be replaced with another ceramic tube (not shown). The shape of the porous tube 22 may change of course according to the shape of electrolyte container such as tube 4'. More than two tubes made of porous material may be used to form a multiple layer in the chamber 11'. Electrolyte tube 4' may be filled by a porous pillar made of, e.g., sintered stainless steel.

According to the present invention, a sodium sulfur storage battery which has many prominent advantages is provided: i.e., it has a long life compared with prior sodium sulfur storage batteries; and, there is not the slightest fear of unexpected dangerous accident.

It is to be understood that this invention is not limited to the examples herein shown and described, but that changes and modifications may be made without departing from the spirit and scope of the invention, as defined in the appended claims.

We claim:

1. A sodium sulfur storage battery, which comprises a tubular cell vessel;
a cover sealing said vessel;
a positive terminal post attached to said cover;
said vessel incorporating a reservoir;
a negative and terminal post extending through the cover of the reservoir and into said reservoir;
a cylindrical tube of solid electrolyte incorporating an anodic reactant into which said negative terminal post extends, said electrolyte tube being affixed to said reservoir at its upper end by glass solder, an apertured partition covering the upper end of said solid electrolyte tube and connecting said solid electrolyte tube with the interior of said reservoir, said partition being in the form of a plate having an aperture with a diameter of between 20 $\mu$ and 200 $\mu$;

an anodic chamber within said cylindrical tube of solid electrolyte, said anodic chamber being divided into a plurality of portions by means of round lateral partition walls each having an aperture with a diameter within the range 20 $\mu$ and 200 $\mu$; and a cathodic reactant arranged outside said solid electrolyte tube and within the cell vessel, said cathodic reactant being infiltrated in a graphite electron conductor filled between said electrolyte tube and said cell vessel, spaces being left above the cathodic reactant and the anodic reactant.

2. A sodium sulfur storage battery as defined in claim 1, in which said solid electrolyte tube surrounds a chamber for anodic reactant, which chamber is divided into a plurality of portions by at least one vertical partition plate, each said portion being in communication with the interior of said reservoir through said aperture.

3. A sodium sulfur storage battery as defined in claim 1, in which said solid electrolyte tube surrounds a chamber for anodic reactant, which chamber is divided into a plurality of portions by partition means comprising a hollow tube provided with longitudinal flanges on the outer surface, each said portion being in communication with the interior of said reservoir through said aperture.

4. A sodium sulfur storage battery as defined in claim 3, wherein said partition means comprises a hollow-tube having longitudinal flanges and round lateral flanges on its outer surface, said lateral flanges having apertures with diameters within the range 20–200 $\mu$.

* * * * *